United States Patent
Sugano et al.

[11] Patent Number: 6,012,004
[45] Date of Patent: Jan. 4, 2000

[54] SYSTEM AND METHOD FOR MANAGING TIME FOR VEHICLE FAULT DIAGNOSTIC APPARATUS

[75] Inventors: Yukio Sugano, Shiraokamachi; Hiroshi Shimura, Yokohama, both of Japan

[73] Assignee: Komatsu Ltd., Tokyo, Japan

[21] Appl. No.: 08/952,727

[22] PCT Filed: May 23, 1996

[86] PCT No.: PCT/JP96/01366

§ 371 Date: Nov. 20, 1997

§ 102(e) Date: Nov. 20, 1997

[87] PCT Pub. No.: WO96/37864

PCT Pub. Date: Nov. 28, 1996

[30] Foreign Application Priority Data

May 25, 1995 [JP] Japan .................................. 7-149786

[51] Int. Cl.$^7$ .............................. G07C 3/00; B60R 16/02
[52] U.S. Cl. ................................ 701/33; 701/35; 395/290
[58] Field of Search .................................. 701/29, 30, 31, 701/33, 35; 395/290, 286, 559, 297

[56] References Cited

U.S. PATENT DOCUMENTS 5,555,171  9/1996  Sonehara et al. .................. 701/29

FOREIGN PATENT DOCUMENTS

| 56-057541 | 5/1981 | Japan . |
| 60-011093 | 1/1985 | Japan . |
| 4-304589 | 10/1992 | Japan . |
| 6-333117 | 12/1994 | Japan . |

*Primary Examiner*—Tan Nguyen
*Attorney, Agent, or Firm*—Sidley & Austin

[57] ABSTRACT

The present invention relates to a system and a method for managing time for a vehicle fault diagnostic apparatus by which temporal contradictions and errors between controllers are eliminated, and fault diagnosis is reliably performed by accurate time. To this end, the system includes a master controller (1) for transmitting a counted time as a standard time, and a plurality of controllers (11a, 11b, 11c, ..., 11n) for determining the time relating to the fault diagnosis on the basis of the received standard time when fault data of sensors, etc., are detected.

20 Claims, 5 Drawing Sheets

SYSTEM AND METHOD FOR MANAGING TIME FOR VEHICLE FAULT DIAGNOSTIC APPARATUS

TECHNICAL FIELD

The present invention relates to time management of a fault diagnostic apparatus for a vehicle, and more particularly, to a system and a method for managing time for a vehicle fault diagnostic apparatus for the management of a standard time among a plurality of controllers in a fault diagnostic apparatus for an industrial vehicle.

BACKGROUND ART

In the situation in which electronic control of engines and transmissions of vehicles is rapidly proceeding, functions required for controlling each component have been highly advanced. In order to satisfy the required functions, the number of devices using a microcomputer (hereinafter, referred to as CPU) in a controller for controlling each component has increased. As a result, a plurality of controllers, each using the CPU, are installed in an electronic control device for one vehicle. With the advancement of the functions of such an electronic control device, fault diagnosis becomes difficult, and it is an important problem as to how faulty points are discovered in a shorter time under fault conditions in order to shorten the downtime of the vehicle.

In order to solve the above problem, vehicle fault diagnostic apparatuses have been proposed in which the CPU of each controller performs the fault diagnosis with respect to the respective controllers, and achieves easy diagnosis by displaying results of the diagnosis. For example, in Japanese Unexamined Patent Publication No. 4-304589, a vehicle fault diagnostic apparatus, shown in FIG. 5, is proposed. According to this proposal, an electronic control device for a vehicle is composed of a master controller 1 and a plurality of controllers 11a, 11b, 11c, . . . , 11n, and the respective controllers are connected to each other by a communication network 10. The master controller 1 and the controllers are composed of a system centered on the CPU.

Each of the controllers inputs signals from a sensor and a switch to control respective components of the vehicle, and outputs a signal to control an actuator, etc., based on the signals. In addition, each of the controllers has a fault detecting section for detecting faults of the above connected sensor and actuator, and always transmits the detected fault data to the master controller 1 through the communication network 10.

The master controller 1 is composed of a CPU 2, a network interface 3, a memory 4, an operating switch 6, and a display 7. The memory 4 stores results of calculations, communication data, and fault information of the respective controllers. The CPU 2 always receives fault data from the controllers 11a, 11b, 11c, . . . , 11n using, for example, a polling method, and checks whether or not there is a bit into which "1" showing fault detection is written in fault items of the received data. When there is a bit into which "1" is written, an error code corresponding to the fault item of the bit is written into a predetermined storage area in the memory 4, and the time elapsed since occurrence of the fault is written into the predetermined storage area.

The predetermined storage area, in which the error code and its elapsed time are stored, is in the form of a fault history such that the error codes are stored in the order of the time at which the error code was generated. That is, the error codes and the elapsed time are stored in the predetermined storage area in the order of generation, and when a predetermined number of error codes are stored, the next and later error codes are stored in the initial address of the above predetermined storage area. In this way, the oldest error code and its elapsed time are stored by being renewed by the latest error code and its elapsed time. In addition, each elapsed time renews the previous elapsed time per a predetermined time (one hour, for example) since occurrence of the fault. Further, when an operator investigates the cause of the fault, the operating switch 6 can be operated to display the previous fault history on the display 7. By analyzing the fault history data, the cause can be investigated in a short time.

On the other hand, with the advancement of the function of controlling the respective components as described above, an analysis of the fault diagnosis has become complicated, resulting in the increased requirement that the timing of the input and output signals between the components, and the state of progress of signals in the respective components be analyzed in detail. For this reason, it is necessary to store the fault history data and the state of progress of the input and output signals, etc., in detail and in large quantity. Thus, in the above conventional vehicle fault diagnostic apparatus, a large memory capacity for storing the fault history data, etc., in the master controller 1 must be prepared. However, since the controllers are vehicle-mounted controllers, considering environmental resistance such as vibration resistance, dust resistance, and waterproofing, a semiconductor memory such as RAM must be used, and considering the volume, etc., to reduce the size of the controllers, the memory capacity is restricted, and cannot be sufficiently increased.

To cope with this, an arrangement can be considered in which the fault history data and the state of progress of the input and output signals of the respective controllers are separately stored in respective memories of the controllers. This allows a memory of large capacity to be prepared in each controller within the restriction of each volume. In addition, an operation counting clock or a time clock is included in each of the controllers, and, with the use of these clocks, the fault data at the time of occurrence of the fault, the conditions of the input and output signals, and the fault occurrence time and the time elapsed from occurrence of the fault are stored in the respective memories in each controller. These stored fault history data and the state of progress of the input and output signals are transmitted in response to a request by the master controller 1, whereby the fault can be analyzed on the display 7, etc., on the side of the master controller 1.

In this case, however, the following problems are encountered. The operation counting clock included in each controller is operated only during the interval when the power of each controller is turned on. However, the power of each controller may be separately turned off due to the fault and an examination of each component, or a controller used in a certain period of time may be removed from the vehicle and attached to another vehicle, whereby the operation counting clocks of the power-turned-off controller and the newly attached controller cause differences between the operation counting clocks of other controllers and the master controller 1. In addition, the above operation counting clock and the time clock include clock errors between the controllers due to the variations of timers, etc. Therefore, in spite of a fault and a phenomenon occurring at the same time, there is a possibility that the stored clock values are different between controllers. This could be a major obstacle in investigation of the cause of the fault by analyzing the fault history data of the respective controllers and the state of progress of the input and output signals, and the fault diagnosis might require a lot of time.

SUMMARY OF THE INVENTION

The present invention has been made to solve the problems of the prior art, and its object is to provide a system and a method for managing time for a vehicle fault diagnostic apparatus which can eliminate temporal contradictions and errors between controllers, and which can reliably perform fault diagnosis by accurate time.

According to the present invention, there is provided a system for managing time for a vehicle fault diagnostic apparatus including a plurality of controllers for detecting a fault of at least one of a sensor and an actuator and for transmitting the detected fault data through a communication network, and a master controller for receiving the fault data, wherein the master controller transmits a counted time to the plurality of controllers as a standard time, and wherein the plurality of controllers, when detecting the fault data, determine the time relating to the fault diagnosis on the basis of the received standard time.

In addition, the master controller can comprise a standard time counting means (9) for counting the standard time, and a controller for transmitting the standard time to the plurality of controllers through the communication network.

Further, each of the plurality of controllers can comprise a standard time storage means for storing the standard time, and a controller for renewing the standard time stored in the standard time storage means on the basis of the standard time received from the master controller, and determining the time relating to the fault diagnosis on the basis of the renewed standard time when a fault occurs.

According to the above arrangements, for example, one of the plurality of controllers is used as a master controller, and the standard time (main standard time) counted by the master controller is transmitted to each of the controllers through the communication network. The respective controllers renew their own secondary standard time on the basis of the received main standard time. This eliminates errors of the standard time between the controllers in the vehicle fault diagnostic apparatus whereby the standard time can be uniformly managed in the overall apparatus.

In addition, each of the plurality of controllers can comprise a fault information storage means for storing at least one of fault occurrence time and elapsed time determined on the basis of the standard time, and the detected fault data.

According to the described arrangement, each of the controllers, when storing data of fault occurred, etc., in the fault information storage means, can store the occurrence time and the elapsed time determined on the basis of the secondary standard time. Therefore, by referring to the fault data at the time of the fault diagnosis, errors and contradictions of the fault occurrence time between the controllers are eliminated, and the time can be correctly recognized, so that the fault diagnosis can be performed in a short time with no error.

In addition, each of the plurality of controllers can comprise a vehicle condition storage means for storing a signal input condition from the sensor and a signal output condition to the actuator, and occurrence time of the input and output conditions determined on the basis of the standard time.

According to the described arrangement, the controllers store the vehicle conditions together with the occurrence time determined on the basis of the secondary standard time in addition to the above fault data at the time of occurrence of the fault, and at each predetermined period. By investigating the timing of the input and output signals, etc., with reference to the vehicle condition data at the time of the fault diagnosis, fault analysis is facilitated, whereby the time of diagnosis can be shortened.

In addition, each of the plurality of controllers can comprise an exchange time storage means for storing the exchange time of the controllers determined on the basis of the standard time.

According to the described arrangement, when the controller breaks down, and is exchanged for a new controller, the time for the exchange is determined on the basis of the main standard time, and stored in the exchange time storage means. This allows exchange history of each of the controllers to be referred to at the time of the fault diagnosis, thereby facilitating the diagnosis. The arrangement can offer similar action and effect when used controllers are installed in a new vehicle, or even if another used controller is installed in a used operating vehicle.

Next, according to the present invention, there is provided a method of managing time for a vehicle fault diagnostic apparatus in which a plurality of controllers detect a fault of at least one of a sensor and an actuator connected to the respective controllers, each of the controllers stores at least one of the occurrence time of the fault and the elapsed time, and the detected fault data, and at least one of the times is regarded as the time relating to the fault, wherein a master controller counts and transmits a standard time to the plurality of controllers, and each of the plurality of controllers determines the time relating to the fault on the basis of the standard time.

By the described arrangement, the controllers renew their own secondary standard time on the basis of the received main standard time, so that errors of the standard time between the controllers in the vehicle fault diagnostic apparatus are eliminated, whereby the standard time can be uniformly managed in the overall apparatus.

BEST MODE FOR CARRYING OUT THE INVENTION

The preferred embodiments of a system and a method for managing time for a vehicle fault diagnostic apparatus according to the present invention will now be described in detail with reference to the attached drawings.

Figure 1:
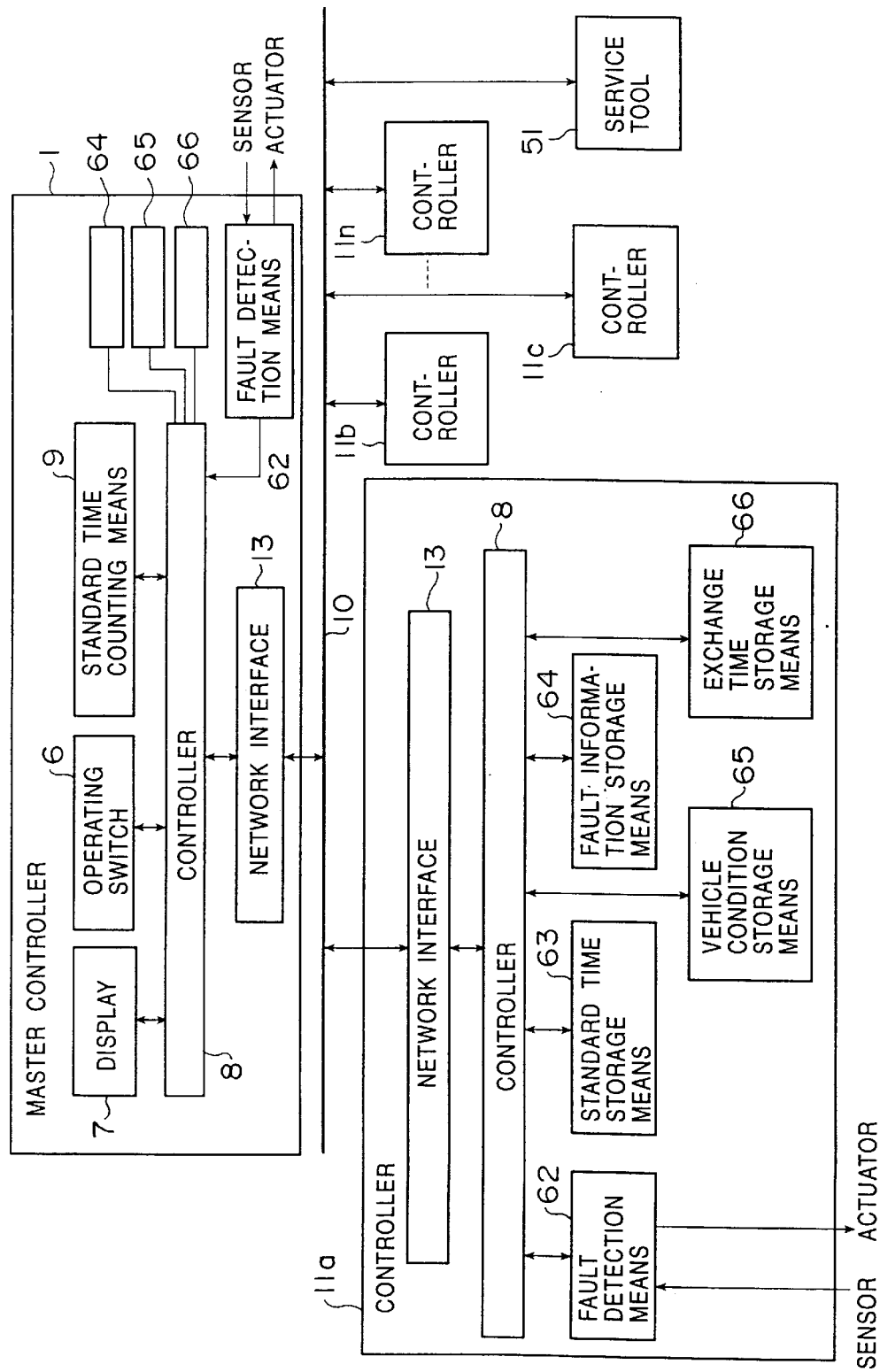
FIG. 1 is a functional block diagram of a vehicle fault diagnostic apparatus according to an embodiment of the present invention.

Referring to FIG. 1, a master controller 1 and controllers 11a, 11b, 11c, . . . , 11n control each of various components of a vehicle, such as an engine, a transmission, and a brake, etc. The controllers 11a, 11b, 11c, . . . , 11n are connected to each other by means of a communication network 10, and constitute a vehicle control apparatus as a whole by transmitting and receiving control information and fault information to and from each other through the communication network 10.

Since the controllers 11a, 11b, 11c, ..., 11n have the same construction, the description will be given taking a controller 11a as an example. Incidentally, the controllers 11a, 11b, 11c, ..., 11n are referred to as controllers 11 in the following description for simplification. Each of the controllers 11 has a controller 8, forming a main part of processing, and the following respective processing means connected to the controller 8. A fault detection means 62 detects a fault of a sensor or an actuator, by a signal inputted from the sensor and a signal outputted to the actuator, and outputs a fault detection signal to the controller 8. A standard time storage means 63 inputs from the controller 8 and stores in the controllers 11 a standard time (hereinafter referred to as a secondary standard time). A fault information storage means 64, when a fault occurs, inputs fault data from the controller 8, such as an error code corresponding to the fault detection signal detected by the above fault detection means 62 and the number of times of generation of error code, and the secondary standard time stored in the standard time storage means 63, and stores both of them.

A vehicle condition storage means 65 inputs a transition progress of input and output signals of the above sensor and actuator from the controller 8, and stores it, for example, for each predetermined period and at the time of occurrence of the fault. At an exchange time, storage means 66 inputs from the controller 8 the above secondary standard time at which the controller 11 is newly exchanged, and stores it. The controller 8 transmits and receives the above data to and from the master controller 1 through the communication network 10 and a network interface 13.

The master controller 1 basically has the same construction as that of each of the controllers 11, but differs from each of the controllers 11 in that it has a standard time counting means 9. The standard time counting means 9 counts a standard time of the overall vehicle fault diagnostic apparatus (hereinafter, referred to as a main standard time) in a predetermined time unit (one minute, for example). The controller 8 of the master controller 1 inputs the counted main standard time value, and the controller 8 stores the main standard time value in its own fault information storage means 64, the vehicle condition storage means 65, and the exchange time storage means 66, etc., for the fault diagnosis, similar to the controllers 11. Therefore, the master controller 1 is not limited thereto, and any one of the plurality of controllers 11 in the vehicle control apparatus can be selected as a master controller, and the standard time counting means 9 can be provided in that controller. Then, the main standard time value is transmitted to other controllers 11 through the network interface 13. The controller 8 of each of the controllers 11 receives the main standard time value, and renews its own secondary standard time based thereon by writing it into the standard time storage means 63.

In this embodiment, the master controller 1 includes an operating switch 6 and a display 7, and the operating switch 6 and the display 7 are connected to the controller 8 of the master controller 1, respectively. The operating switch 6 is an input switch for designating an object to be displayed for displaying the above fault information, vehicle condition, and exchange time, etc., of the controllers 11 at the time of fault diagnosis. The display 7 displays them, and is composed of, for example, an LED display, capable of displaying an error code and a generation time, and a character display, capable of displaying error contents, etc. The controller 8 of the master controller 1 transmits a display object designating signal inputted from the operating switch 6 to a controller 11 through the communication network 10. The controller 8 of that controller 11 transmits the fault information, vehicle conditions, and exchange time, etc., corresponding to the display object designating signal to the master controller 1 through the communication network 10. The controller 8 of the master controller 1 outputs the received data to the display 7.

The operating switch 6 and the display 7 for displaying the fault information, vehicle conditions, and the exchange time, etc., can be provided on a service tool 51, which can be connected to the communication network 10. The service tool 51 can be connected exclusively for the fault diagnosis, and it can be connected to the communication network 10 either at all times or only at the time of the fault diagnosis. The service tool 51 is connected to the network interface 13, etc., in addition to the operating switch 6 and the display 7.

Figure 2:
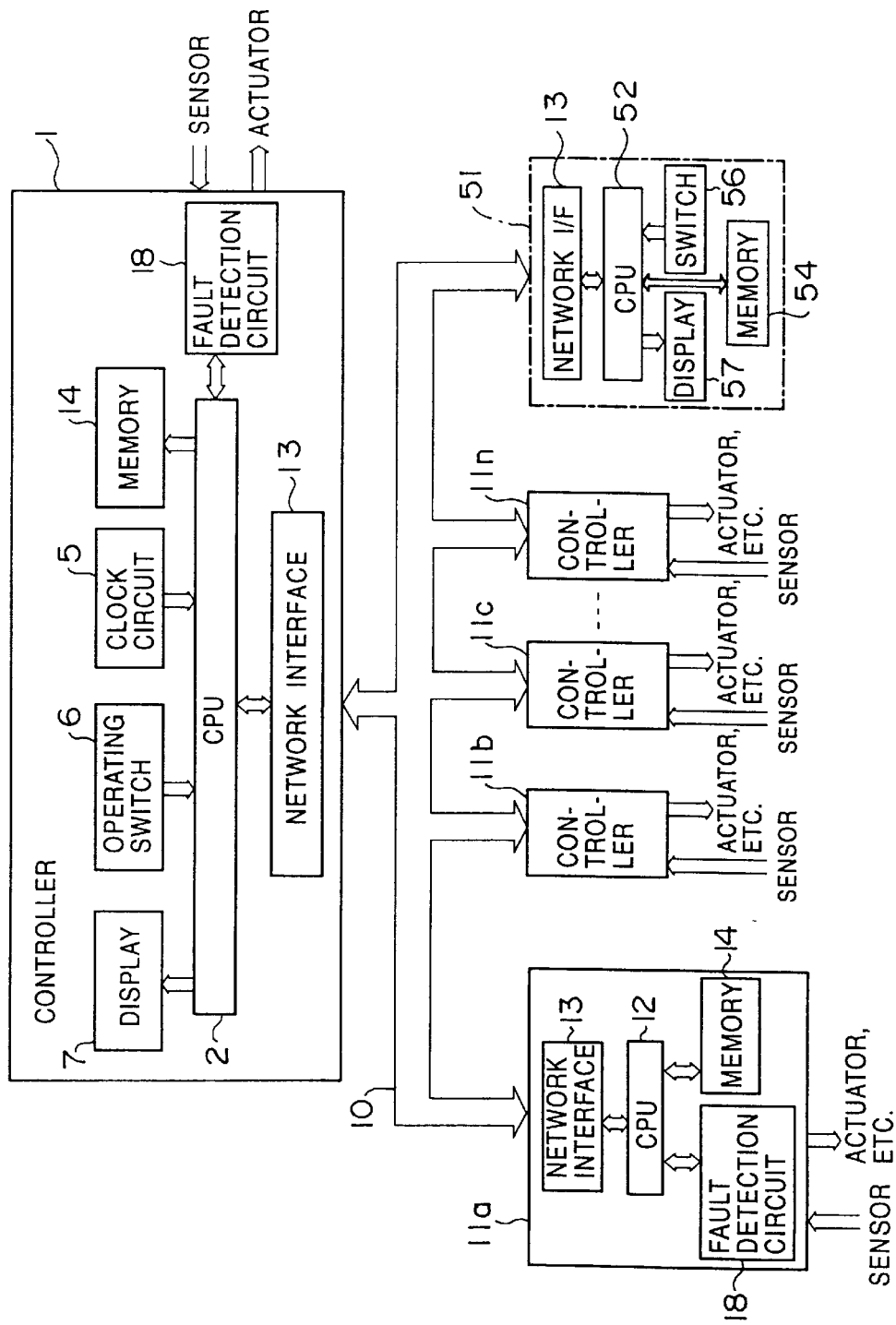
FIG. 2 is a circuit diagram of the vehicle fault diagnostic apparatus according to the embodiment.

FIG. 2 is a circuit diagram in which each of the controllers 11 is composed of a microcomputer system centered on a CPU 12. A fault detection circuit 18 detects a fault of a sensor or an actuator by a signal inputted from the sensor and a signal outputted to the actuator, and outputs the detected fault data to the CPU 12. A memory 14, which is a writable memory for storing data, such as fault information, vehicle condition, and exchange time, can hold its storage contents even if the power of the controllers 11 is turned off, and is composed of, for example, a RAM of a battery-protected CMOS type. The CPU 12 can transmit and receive the data to and from the other controllers 11, the master controller 1 and the service tool 51 via the communication network 10 passing through the network interface 13.

The basic construction of the master controller 1 is the same as that of each of the controllers 11. That is, it is composed of a microcomputer system centered on a CPU 2 (equivalent to the CPU 12), and comprises a fault detection circuit 18, a memory 14, and a network interface 13, etc. However, the construction of the master controller 1 is different from that of the controller 11, in that the master controller 1 comprises a clock circuit 5 for counting the main standard time. It is assumed that the clock circuit 5 has a circuit for sending a clock signal of a predetermined frequency, and counts the clock signal to output an interrupt service-requesting signal to the CPU 2 for each predetermined time (one minute, for example). The master controller 1 also comprises an operating switch 6 and a display 7, and they are connected to the CPU 2.

The service tool 51 is composed of a similar microcomputer system centered on a CPU 52, and comprises similarly a memory 54, a network interface 13, a switch 56, and a display 57. The memory 54 stores fault diagnosis data, and can be a RAM of a battery-protected CMOS type, for example. In addition, the switch 56 and the display 57 have the same functions as those of the above operating switch 6 and the display 7 of the master controller 1, respectively. The service tool 51 can be composed of, for example, a normal personal computer, etc.

A method of managing a time for a vehicle fault diagnostic apparatus in the above arrangements will be described.

Figure 3:
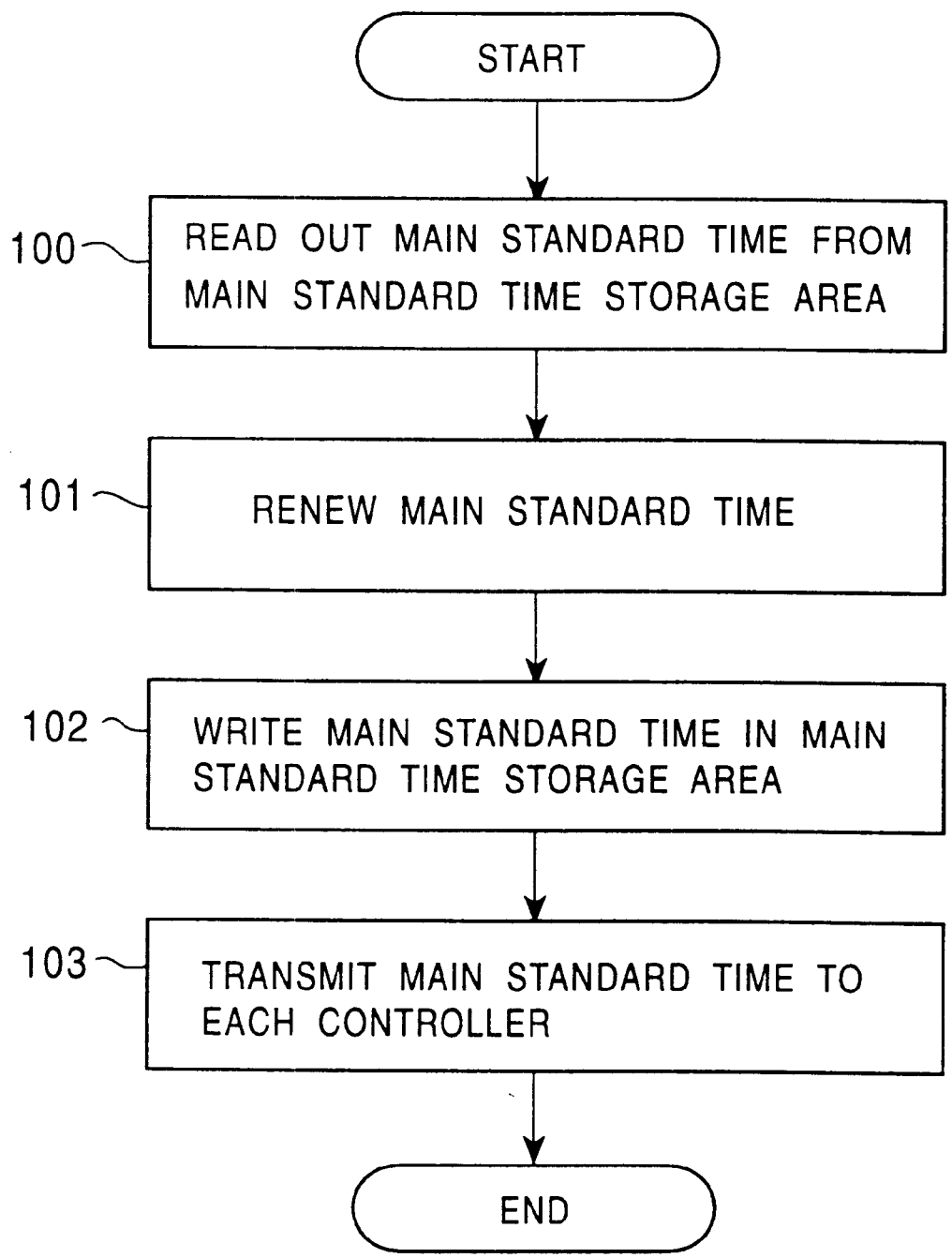
FIG. 3 is a flowchart for a time management processing of a master controller 1 according to the embodiment.

FIG. 3 shows a time management processing flow of the CPU 2 of the master controller 1 in which the following interrupt service is performed by an interrupt signal from the clock circuit 5 per a predetermined time.

Step 100

The main standard time is read from a predetermined main standard time storage area in the memory 14, and the procedure advances to step 101.

Step 101

The main standard time is renewed. For example, when the interrupt service is executed once per minute, one minute is added to the old main standard time to obtain the new main standard time. Then, the procedure advances to step 102.

Step 102

The new main standard time is written in a predetermined main standard time storage area, and the procedure advances to step 103.

Step 103

The new main standard time is transmitted to each of the controllers 11, and the procedure advances to the end of the interrupt service.

By the interrupt service as described above, the CPU 2 can renew the main standard time for each predetermined time, and transmit the renewed main standard time to each of the controllers 11 through the communication network 10.

Figure 4:
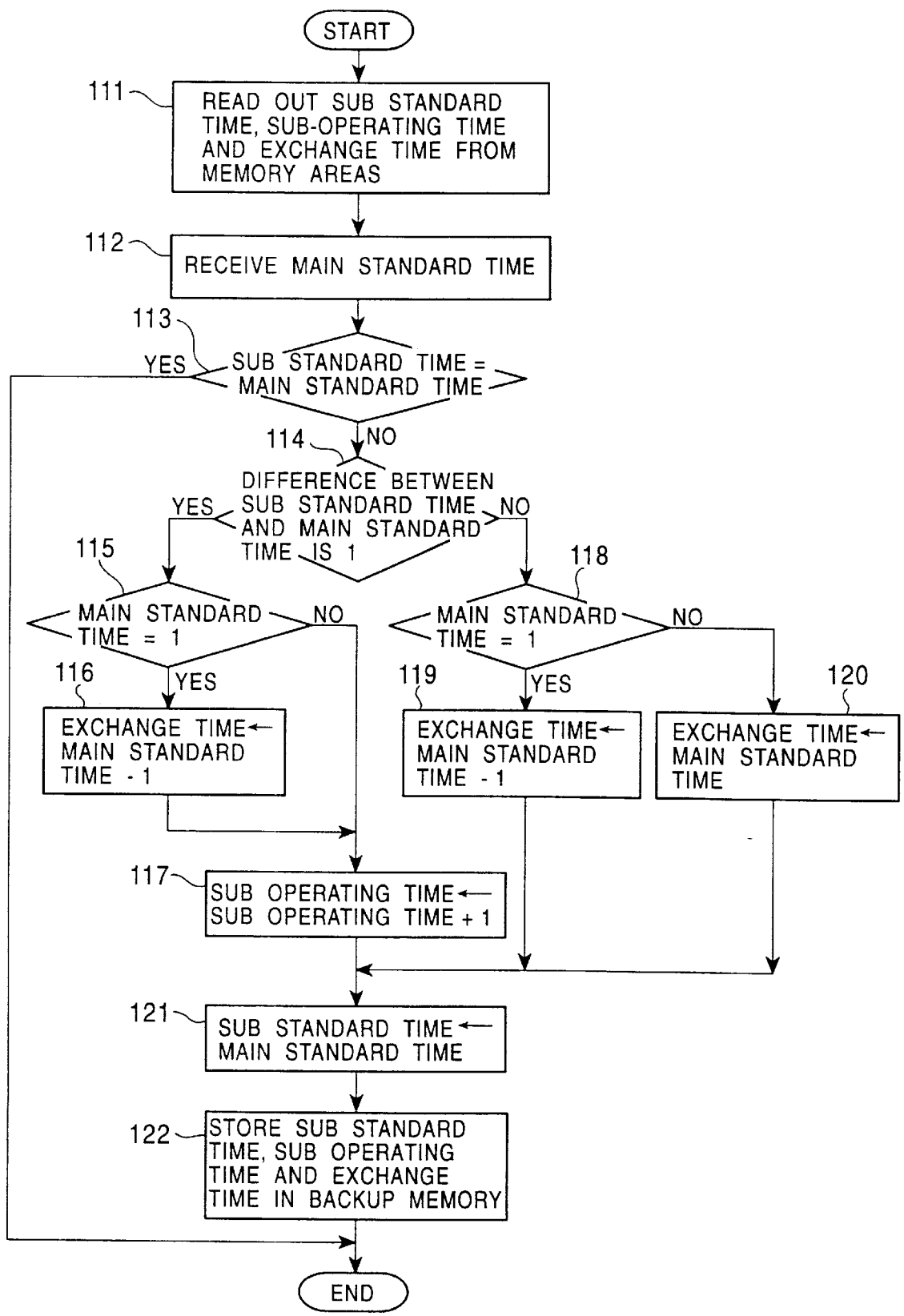
FIG. 4 is a flowchart for a time management processing of a controller 11 according to the embodiment.
Figure 5:
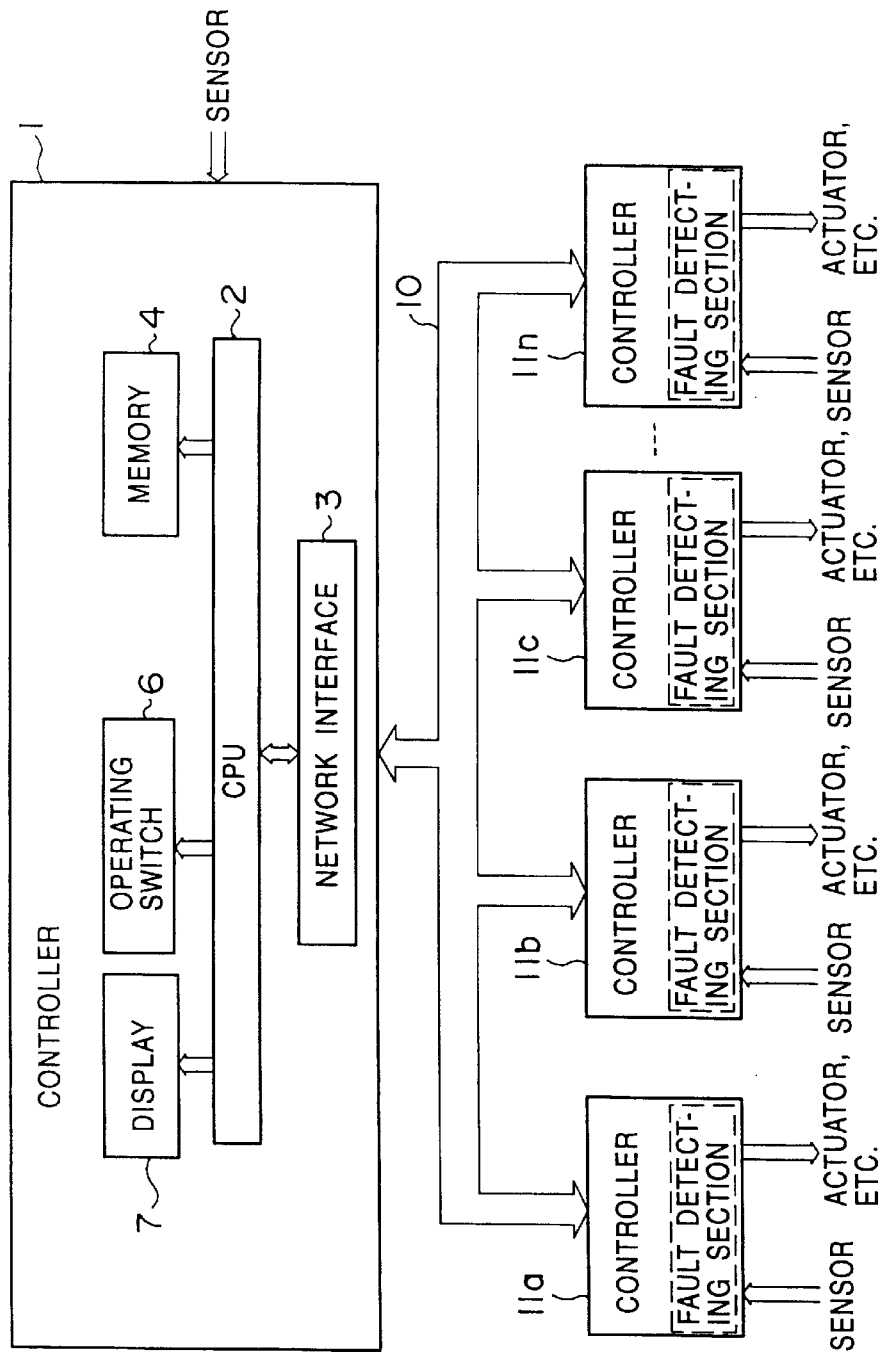
FIG. 5 is a functional block diagram of a vehicle fault diagnostic apparatus according to a prior art.

Next, the time management processing of the CPU 12 of each of the controllers 11 will be described with reference to the flowchart of FIG. 4. Here, it is assumed that the CPU 12 performs the following processing per a predetermined period. However, the processing period of the CPU 12 is set to a short period such that an error with respect to the predetermined period of the CPU 2 for transmitting the main standard time (that is, a renewal unit time of the secondary standard time) can be ignored. In addition, in the following processing, the exchange time represents a standard time when the respective controllers 11 are mounted to the present vehicle and the power is initially turned ON. The secondary standard time is the standard time stored in each of the controllers 11, and the secondary operating time represents the operating time in which each of the controller 11 is used. In addition, when each of the controllers 11 is a new article and the power is initially turned ON, the data of the exchange time, secondary standard time, and secondary operating time are initialized to 0.

Step 111

The secondary standard time, the secondary operating time, and the exchange time are read from predetermined storage areas of the memory 14, and the procedure advances to step 112.

Step 112

The main standard time is received from the master controller 1, and the procedure advances to step 113.

Step 113

The secondary standard time is compared with the main standard time to check whether or not they are equal to each other. When they are equal to each other, the procedure advances to end (completion of the processing) as the main standard time has not been renewed yet. When they are not equal to each other, the procedure advances to step 114 as the main standard time has been renewed.

Step 114

It is judged whether or not the difference between the secondary standard time and the main standard time is 1 (renewal unit time). When the different is 1, it is a normal time renewal, and the procedure advances to step 115. If not, the procedure advances to step 118.

Step 115

It is judged whether or not the main standard time is 1 (renewal unit time). When the main standard time is 1, the vehicle is a new vehicle, and the procedure advances to step 116. When the main standard time is not 1, it is a normal time renewal, and the procedure advances to step 117.

Step 116

Since the vehicle is a new vehicle, one renewal unit time is subtracted from the main standard time to set the exchange time to 0. Then, the procedure advances to step 117.

Step 117

Since one renewal unit time has elapsed from the preceding processing, the secondary operating time is incremented by one renewal unit time, and the procedure advances to step 121.

Step 118

It is judged whether or not the main standard time is 1 (renewal unit time). When the main standard time is 1, the vehicle is a new vehicle, and from the result of step 114, used controllers in which the secondary standard time advances are installed, and the procedure advances to step 119. When the main standard time is not 1, the vehicle is a used operating vehicle, and the procedure advances to step 120.

Step 119

Since the vehicle is a new vehicle, one renewal unit time is subtracted from the main standard time to set the exchange time to 0. Then, the procedure advances to step 121.

Step 120

Since the vehicle is the used operating vehicle, the exchange time is equalized to the main standard time, and the procedure advances to step 121.

Step 121

Since one renewal unit time has e lapsed from the preceding processing, the secondary standard time is equalized to the main standard time, and the procedure advances to step 122.

Step 122

The renewed secondary standard time, secondary operating time, and exchange time are written in each of the predetermined storage areas of the memory 14 to complete the processing.

In this way, when the main standard time is renewed by one renewal unit time, the CPU renews the secondary standard time, the secondary operating time, and the exchange time, stored in each of the controllers 11, based on the new main standard time. Therefore, since these times are uniformly renewed by the main standard time of the master controller 1, time errors between the controllers 11 are eliminated.

In addition, each of the controllers 11 stores time data based on the uniform standard time when storing fault information, vehicle conditions, etc., at the time of occurrence of the fault in the predetermined areas. That is, the CPU 12, when inputting fault data detected by the fault detection circuit 18, reads out the secondary standard time at the time of occurrence of the fault (hereinafter, referred to as a fault occurrence time) and the secondary operating time, and writes the fault data, the-fault occurrence time, and the secondary operating time as fault information in predetermined fault information storage areas of the memory 14. Further, an elapsed time from the time of occurrence of the fault can be stored as fault information, and the elapsed time can be determined by subtracting the fault occurrence time from the secondary standard time for each predetermined time. The CPU 12 writes the input sensor signal, the output actuator control signal, and the input and output times thereof into the predetermined vehicle condition storage area, for example, for each predetermined period.

In addition, the fault information, the vehicle conditions, and the exchange time, etc., can be displayed on the display 7 by the operating switch 6 of the master controller 1. Further, in the case of connecting the service tool 51, they can be displayed in the same manner as described above. By viewing these display contents, the details of the fault, the fault occurrence time, the elapsed time, the input and output signals and the input and output times thereof, and the exchange time can be analyzed in proper sequence of time, so that inquiries into the cause of the fault can be certainly conducted.

INDUSTRIAL APPLICABILITY

The present is useful as a system and a method for managing time for a vehicle fault diagnostic apparatus which can uniformly manage time, and reliably perform the fault diagnosis by accurate time because the time of a plurality of controllers are renewed on the basis of a standard time of a master controller.

We claim:

1. A vehicle fault diagnostic apparatus comprising:
   a communication network;
   a plurality of controllers, each of said plurality of controllers having connected thereto at least one of a respective sensor and a respective actuator for detecting a fault of the respective at least one and for transmitting detected fault data through said communication network; and
   a master controller for receiving said detected fault data from said communication network;
   wherein said master controller transmits a counted time to each of said plurality of controllers as a standard time; and
   wherein each respective one of said plurality of controllers, when detecting a fault of the respective at least one to produce detected fault data, determines a time relating to a fault diagnosis on a basis of the standard time which was transmitted by the master controller to the respective one of said plurality of controllers.

2. Apparatus in accordance with claim 1, wherein each of said plurality of controllers comprises a fault information storage means for storing said detected fault data and at least one of a fault occurrence time and an elapsed time, determined on a basis of said standard time.

3. Apparatus in accordance with claim 1, wherein each of said plurality of controllers comprises:
   a vehicle condition storage means, for storing at least one of a signal input condition from a sensor and a signal output condition to an actuator, and for storing an occurrence time of said at least one of a signal input condition and a signal output condition, determined on a basis of said standard time.

4. Apparatus in accordance with claim 1, wherein each of said plurality of controllers comprises an exchange time storage means for storing an exchange time of a respective one of said plurality of controllers, determined on a basis of said standard time.

5. Apparatus in accordance with claim 1, wherein said master controller comprises:
   a standard time counter for counting said standard time; and
   a controller for transmitting said standard time to each of said plurality of controllers through said communication network.

6. Apparatus in accordance with claim 5, wherein each of said plurality of controllers comprises a fault information storage means for storing said detected fault data and at least one of a fault occurrence time and an elapsed time, determined on a basis of said standard time.

7. Apparatus in accordance with claim 5, wherein each of said plurality of controllers comprises:
   a vehicle condition storage means, for storing at least one of a signal input condition from a sensor and a signal output condition to an actuator, and for storing an occurrence time of said at least one of a signal input condition and a signal output condition, determined on a basis of said standard time.

8. Apparatus in accordance with claim 5, wherein each of said plurality of controllers comprises an exchange time storage means for storing an exchange time of a respective one of said plurality of controllers, determined on a basis of said standard time.

9. Apparatus in accordance with claim 1, wherein each of said plurality of controllers comprises:
   a standard time storage means for storing standard time; and
   a controller for renewing the standard time, which is stored in said standard time storage means, on a basis of the standard time transmitted by said master controller, and for determining a time relating to a fault diagnosis on a basis of the resulting renewed standard time when a fault occurs.

10. Apparatus in accordance with claim 9, wherein each of said plurality of controllers comprises a fault information storage means for storing said detected fault data and at least one of a fault occurrence time and an elapsed time, determined on a basis of said standard time.

11. Apparatus in accordance with claim 9, wherein each of said plurality of controllers comprises:
    a vehicle condition storage means, for storing at least one of a signal input condition from a sensor and a signal output condition to an actuator, and for storing an occurrence time of said at least one of a signal input condition and a signal output condition, determined on a basis of said standard time.

12. Apparatus in accordance with claim 9, wherein each of said plurality of controllers comprises an exchange time storage means for storing an exchange time of a respective one of said plurality of controllers, determined on a basis of said standard time.

13. A method of managing time for a vehicle fault diagnostic apparatus in which each of a plurality of controllers is connected to at least one of a respective sensor and a respective actuator for detecting a fault of said at least one, said method comprising the steps of:
    transmitting to each of said plurality of controllers a standard time;
    storing, in each of said plurality of controllers which detects a fault, detected fault data and at least one of an occurrence time of said fault and an elapsed time, whereby at least one of said occurrence time and said elapsed time is regarded as a time relating to the detected fault; and
    each of said plurality of controllers determining a time relating to a fault, detected by a respective controller, on a basis of said standard time.

14. A method in accordance with claim 13, wherein the step of transmitting is accomplished from a master controller through a network.

15. A method in accordance with claim 13, wherein the step of determining a time comprises:
    storing, in each of said plurality of controllers, a standard time which has been transmitted in the step of transmitting;

renewing the thus stored standard time in each of said plurality of controllers with a new standard time which is transmitted in the step of transmitting; and storing the thus renewed standard time, in a respective one of said plurality of controllers which detects a fault, as the occurrence time of said fault.

16. A method in accordance with claim 15, further comprising:

replacing one of said plurality of controllers with a different controller; and then storing in said different controller a standard time which has been transmitted in the step of transmitting.

17. A method in accordance with claim 15, wherein the step of transmitting is accomplished from a master controller through a network.

18. A method in accordance with claim 17, further comprising transmitting, from a respective one of said plurality of controllers which has detected a fault, to said master controller detected fault data and at least one of an occurrence time of said fault and an elapsed time, whereby said at least one of said occurrence time and said elapsed time is regarded as a time relating to the detected fault.

19. A method in accordance with claim 18, further comprising storing in said master controller each detected fault data and associated time relating to the detected fault to provide a stored fault history.

20. A method in accordance with claim 19, further comprising analyzing the stored fault history.

* * * * *